(12) United States Patent

Xu et al.

(10) Patent No.: US 12,567,760 B1

(45) Date of Patent: Mar. 3, 2026

(54) LED LAMP DRIVE SYSTEM WITH EMERGENCY POWER SUPPLY THEREOF

(71) Applicant: GUANGDONG SNC TECHNOLOGY CO., LTD., Zhongshan (CN)

(72) Inventors: Jianyong Xu, Zhongshan (CN); Zhengwen Huang, Zhongshan (CN); Linguang Zhang, Zhongshan (CN); Hui Tang, Zhongshan (CN)

(73) Assignee: GUANGDONG SNC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/274,493

(22) Filed: Jul. 19, 2025

(30) Foreign Application Priority Data

Mar. 14, 2025 (CN) .......................... 202510306404.1

(51) Int. Cl.
| | |
|---|---|
| *H02J 9/06* | (2006.01) |
| *H05B 45/14* | (2020.01) |
| *H05B 45/325* | (2020.01) |
| *H05B 45/375* | (2020.01) |
| *H05B 47/17* | (2020.01) |

(52) U.S. Cl.
CPC ................ *H02J 9/06* (2013.01); *H05B 45/14* (2020.01); *H05B 45/325* (2020.01); *H05B 45/375* (2020.01); *H05B 47/172* (2024.01)

(58) Field of Classification Search
CPC ......... H02J 9/06; H05B 45/14; H05B 45/325; H05B 45/375; H05B 47/172
See application file for complete search history.

(56) References Cited

U.S. PATENT DOCUMENTS

| | | | | |
|---|---|---|---|---|
| 10,998,762 | B1 * | 5/2021 | Chen ...................... | H05B 47/18 |
| 2021/0384760 | A1 * | 12/2021 | Hsia ........................ | H02J 9/065 |

FOREIGN PATENT DOCUMENTS

WO WO-2017089755 A1 * 6/2017 ............. H05B 45/10

* cited by examiner

*Primary Examiner* — Rexford N Barnie
*Assistant Examiner* — Thai H Tran
(74) *Attorney, Agent, or Firm* — Hemisphere Law, PLLC

(57) ABSTRACT

The present disclosure provides an LED lamp drive system with an emergency power supply thereof configured to detect an input voltage of an electric supply network or an emergency power supply to determine whether the LED lamp drive system is during in an emergency working mode or a mains power working mode, and a power switching module configured to control a drive control module to isolate or connect a drive regulation signal that corresponds to a sensor module to an LED drive power supply, for lighting up LED light beads thereof. During in the emergency working mode, the drive control module isolates the drive regulation signal that corresponds to the sensor module, and during in the mains power working mode, the sensor module inputs a detection signal, and the drive regulation signal corresponding to the detection signal is connected to the LED drive power supply for providing flexible illumination thereof.

21 Claims, 8 Drawing Sheets

In an emergency working mode (A1)

In the emergency working mode (A11)

In the mains power working mode (A21)

In the mains power working mode (A22)

In the emergency working mode (A12)

LED LAMP DRIVE SYSTEM WITH EMERGENCY POWER SUPPLY THEREOF

CROSS-REFERENCE TO RELATED APPLICATION

This application claims priority to Chinese Patent Application No. 202510306404.1, titled "LED LAMP DRIVE SYSTEM WITH EMERGENCY POWER SUPPLY THEREOF" and filed to the China National Intellectual Property Administration on Mar. 14, 2025, the entire contents of which are incorporated herein by reference.

TECHNICAL FIELD

The present disclosure relates to the field of LED lamp control technologies, and especially relates to an LED lamp drive system with an emergency power supply thereof.

BACKGROUND

FIG. 1 is a schematic diagram of a conventional LED lamp drive system with an emergency power supply thereof. The conventional LED lamp drive system includes:

a. an electric supply network 90 configured to output an alternating current (AC) voltage or an alternating current (AC) to the outside fro driving external modules or devices to work;

b, an LED light-emitting module 92 configured to receive electrical energy and light up LED light beads to emit light;

c, an LED drive power supply 91 with a built-in AC-DC module 910. The AC-DC module 910 is configured to receive the AC voltage from the electric supply network 90, convert the AC voltage into a DC (direct current) voltage, and drive the LED light-emitting module 92 to emit light through the LED drive power supply 91;

d, an emergency power supply 93 including a built-in energy storage module 930 and electrically connected to both the electric supply network 90 and the LED drive power supply 91; and e, a control sensor 94 configured to detect an environment around the LED lamp, send detection data according to a detection result thereof, and send the detection data to the LED drive power supply 91, so that the LED drive power supply 91 can perform a corresponding driving control based on the detection data.

In the related art, there are a plurality of different control sensors 94 configured to detect different environmental data, such as an infrared sensor configured to monitor biological activity within a detection range, obtain monitoring data and trigger that the LED drive power supply 91 is turned on or turned off. For example, a photosensitive sensor is configured to detect the ambient light intensity, and when the ambient light intensity is below a threshold, the LED drive power supply 91 drives the LED light-emitting module 92 to work for providing illumination thereof. For example, an ultrasonic sensor is configured to detect a moving object within the detection range, and when a signal of the moving object is detected, the LED drive power supply 91 drives the LED light-emitting module 92 to work for providing illumination thereof. Of course, it can also include a voice controlled sensor, a microwave induction sensor, and so on.

In the related art, when the control sensor 94 detects corresponding detection data, the LED drive power supply 91 is triggered to work in various states, such as lighting up the LED light-emitting module 92, delaying to turn off the illumination, switching the lighting intensity and other combinations of various states, which can flexibly realize personalized illumination of the LED lamp.

In the related art, the LED lamp drive system works in two working modes:

First, in a mains power working mode.

At this time, the electric supply network 90 supplies power. The LED drive power supply 91 controls the LED light-emitting module 92 to work based on the detection data that is sent from the control sensor 94. The electric supply network 90 not only supplies power to the LED drive power supply 91, but also charges the energy storage module 930 within the emergency power supply 93 to ensure that there are sufficient electrical energy in the energy storage module 930. At this time, the emergency power supply 93 does not participate in the operation of LED drive power supply 91. During in the mains power working mode, the electric supply network 90 provides an AC voltage or an AC current to the LED drive power supply 91, and the AC voltage or the AC current is converted by the AC-DC module 910 to drive the LED drive power supply 91.

Second, in an emergency working mode.

At this time, the electric supply network 90 is turned off, which is caused by power grid blackout, wire failures and other reasons. When the electric supply network 90 is on a power outage, the emergency power supply 93, as a backup power source, starts working. The electrical energy that is stored in the energy storage module 930 is supplied to the LED drive power supply 91 through the emergency power supply 93, which provides a DC voltage or a DC current, similarly, the LED drive power supply 91 drives the LED light-emitting module 92 to emit light.

However, during in the emergency working mode, an illumination mode of the LED lamp has certain peculiarities. At this time, the electric supply network 90 is cut off, and other electrical devices and illumination devices around the LED lamps are also cut off. At this time, a main function of the LED lamp is taken as an emergency lamp for providing continuous illumination, rather than focusing on adjusting a working status thereof. However, in the related art, when the LED lamp works in the emergency working mode, the control sensor 94 is still in a working state, and the LED drive power supply 91 will still control the working state of the LED light-emitting module 92 according to a preset driving mode based on the detection data of the control sensor 94. For example, during in the emergency working mode, it is assumed that the control sensor 94 is an ultrasonic detection sensor, when there is no moving object entering the detection range of the control sensor 94 under a condition that the emergency power supply 93 supplies power, the LED drive power supply 91 still can't make the LED light-emitting module 92 light up, because at this time, the control sensor 94 does not have a detection signal to send to the LED drive module 91 for triggering the LED light-emitting module 92 to light up, so that an area around the LED lamp is still in darkness. Another situation is during in the emergency working mode: when someone approaches the LED lamp, the control sensor 94 detects the detection signal that causes the LED light-emitting module 92 to emit light. At this time, it may be emit light at a fixed time or a delayed shutdown state, when the fixed time is passed, the LED lamp will still turn off. It can be seen from the above that an illumination status is flexibly set through controlling the surrounding environment is not applicable in the emergency work mode.

Therefore, how to design an LED lamp drive system to isolate the control sensor during the LED lamp in the emergency working mode, so that the LED lamp is only used for providing continuous emergency illumination, and the LED lamp is to automatically enter the mains power working mode when the electric supply network is restored after occurring a power outage, is the technical problem that needs to be solved.

SUMMARY

The technical problems to be solved: in view of the shortcomings of the related art, an objective of the present disclosure is to provide an LED lamp drive system with an emergency power supply thereof which can solve technical problems in the related art that a sensor of the LED lamp with an emergency power supply still works during in an emergency working mode, resulting in incompatibility between the sensor and an LED drive power supply and inability to adapt to an emergency working environment.

An LED lamp drive system with an emergency power supply thereof according to an embodiment of the present disclosure is provided, the LED lamp drive system (100) electrically connected with an electric supply network (200) and configured to obtain electrical energy from the electric supply network (200), wherein the LED lamp drive system (100) includes:

an emergency power supply (10) electrically connected to the electric supply network and configured to obtain electrical energy from the electric supply network and then store the electrical energy that is obtained, so as to transmit the stored electrical energy to the outside during in an emergency working mode (A1);

a power switching module (20) electrically connected to both the electric supply network and the emergency power supply, and configured to switch a working mode (A) of the LED lamp drive system according to an input voltage (b1) of the electric supply network, wherein the working mode (A) includes the emergency working mode (A1) and a mains power working mode (A2), and the power switching module is configured to output a mode switching signal (b4);

an LED drive power supply (30) electrically connected to both the emergency power supply and the power switching module, and configured to obtain electrical energy from the emergency power supply during in the emergency working mode, or obtain electrical energy from the electric supply network through the emergency power supply (10) during in the mains power working mode;

a sensor module (40) configured to obtain a peripheral environmental status of the LED lamp drive system and output a detection signal (b2) based on the environmental status;

an LED light bead (50) electrically connected to the LED drive power supply, wherein the LED light bead is driven by the LED drive power supply to be lit up;

a drive control module (60) electrically connected to all of the power switching module, the sensor module and the LED drive power supply, and configured to obtain the detection signal (b2) of the sensor module and output a drive regulation signal (b3) to the LED drive power supply according to the detection signal, so that the LED drive power supply drives the LED light bead to light up according to a drive mode (B) corresponding to the detection signal, wherein the drive regulation signal (b3) includes a first state (b3-1) and a second state (b3-2), and the drive regulation signal (b3) in the first state (b3-1) is independent from the detection signal (b2) of the sensor module (40), while the drive regulation signal (b3) in the second state (b3-2) corresponds to the detection signal (b2); and wherein the drive control module is controlled by a mode switching signal (b4) that is sent from the power switching module, and configured to control the drive regulation signal (b3) to be the first state (b3-1) or the second state (b3-2) according to different working modes (A) that are switched by the power switching module; and wherein during in the emergency working mode (A1), the drive control module outputs the drive regulation signal (b3) of the first state (b3-1), so that both the LED drive power supply and the LED light bead are not controlled by the sensor module, and during in the mains power working mode (A2), the drive control module outputs the drive regulation signal (b3) of the second state (b3-2), so that both the LED drive power supply and the LED light bead are controlled by the sensor module.

During the LED lamp drive system in the mains power working mode, the LED drive power supply 30 can perform differentiated and customized illumination ways based on the detection signal of the sensor module 40. And during in the emergency working mode (A1), the emergency power supply 10 supplies power to the LED drive power supply 30, the power switching module 20 is configured to switch a power supply mode of the LED drive power supply 30 when the power switching module 20 detects the input power supply (b1) to switch the working mode thereof, and isolate detection data of the sensor module to prevent the sensor module from controlling the LED drive power supply during in the emergency working mode, which is more suitable for emergency working environments thereof.

An LED lamp drive system with an emergency power supply thereof according to an embodiment of the present disclosure is provided. The LED lamp drive system (101) is electrically connected with an electric supply network (201) and configured to obtain electrical energy from the electric supply network (201), wherein the LED lamp drive system (101) includes:

an emergency power supply (11) electrically connected to the electric supply network and configured to obtain electrical energy from the electric supply network and then store the electrical energy that is obtained, so as to transmit the stored electrical energy to the outside during in an emergency working mode (A11);

a power switching module (21) electrically connected to both the electric supply network and the emergency power supply, and configured to switch a working mode (A1) of the LED lamp drive system (101) according to an input voltage (b11) of the electric supply network, wherein the working mode (A1) includes the emergency working mode (A11) and a mains power working mode (A21);

an LED drive power supply (31) electrically connected to both the emergency power supply and the power switching module, and configured to obtain electrical energy from the emergency power supply during in the emergency working mode, or obtain electrical energy from the electric supply network through the emergency power supply (11) during in the mains power working mode;

a sensor module (41) configured to obtain a peripheral environmental status of the LED lamp drive system and output a detection signal (b21) based on the environmental status;

an LED light bead (51) electrically connected to the LED drive power supply, wherein the LED light bead is driven by the LED drive power supply to be lit up;

a drive control module (61) electrically connected to input terminals (ACL/ACN) of the LED drive power supply, the sensor module and the LED drive power supply, and configured to obtain the detection signal (b21) of the sensor module and output a drive regulation signal (b31) to the LED drive power supply according to the detection signal, so that the LED drive power supply drives the LED light bead to light up according to a drive mode corresponding to the detection signal, wherein the drive regulation signal (b31) includes a first state (b31-1) and a second state (b31-2), and the drive regulation signal (b31) in the first state (b31-1) is independent from the detection signal (b21) of the sensor module (41), while the drive regulation signal (b31) in the second state (b31-2) corresponds to the detection signal (b21); and wherein the drive control module is controlled by an input voltage (b11) of the LED drive power supply, corresponding to different working modes (A1) according to different input voltages (b11), and controls the drive regulation signal (b31) to be the first state (b31-1) or the second state (b31-2); and wherein during in the emergency working mode (A11), the drive control module outputs the drive regulation signal (b31) of the first state (b31-1), so that both the LED drive power supply and the LED light bead are not controlled by the sensor module, and during in the mains power working mode (A21), the drive control module outputs the drive regulation signal (b31) of the second state (b31-2), so that both the LED drive power supply and the LED light bead are controlled by the sensor module; and wherein the input voltage (b11) includes an AC (alternating current) voltage from the electric supply network or a DC (direct current) voltage from the emergency power supply, wherein when the input voltage (b11) is the DC voltage, the drive control module isolates the detection signal (b21) and outputs the drive regulation signal (b31) of the first state (b31-1) that is unrelated to the detection signal (b21), and when the input voltage (b11) is the AC voltage, the drive control module receives the detection signal (b21) of the sensor module to output the drive regulation signal (b31) of the second state (b31-2) that corresponds to the detection signal (b21).

In the present disclosure, the voltage of the input terminal of the LED drive power supply is detected to determine the working state of the LED lamp drive system. Subsequently, the input voltage that is detected is correspondingly converted to a high level or a low level, and then the high level signal and the low level signal are amplified to control the drive control module, so that the drive control module that is in the emergency working mode is controlled to disconnect the sensor module and output the drive regulation signal (b31) of the first state (b31-1) to prevent the sensor module from controlling the LED drive power supply. While, during in the mains power working mode, the sensor module is connected, and the detection signal of the sensor module is configured to output the drive regulation signal (b31) of the second state (b31-2) that is associated with the detection signal. Correspondingly, the LED drive power supply is controlled to obtain a specific control mode of the LED light bead, thereby obtaining flexible and variable illumination schemes thereof.

An LED lamp drive system with an emergency power supply thereof according to an embodiment of the present disclosure is provided. The LED lamp drive system (102) is electrically connected with an electric supply network (202) and configured to obtain electrical energy from the electric supply network (202), the LED lamp drive system (102) including an emergency working mode (A12) and a mains power working mode (A22), wherein the LED lamp drive system (102) further includes:

an emergency power supply (12) electrically connected to the electric supply network and configured to obtain electrical energy from the electric supply network and then store the electrical energy that is obtained, so as to transmit the stored electrical energy to the outside during in the emergency working mode (A12), wherein the emergency power supply (12) is further configured to output a constant electrical signal (A0) that includes a first signal (A01) and a second signal (A02) different from each other;

a power switching module (22) electrically connected to both the electric supply network and the emergency power supply, and configured to switch a working mode (A1) of the LED lamp drive system (102) to be the emergency working mode (A12) or the mains power working mode (A22) by using the constant electrical signal (A0) according to an input voltage (b11) of the electric supply network;

an LED drive power supply (32) electrically connected to both the emergency power supply and the power switching module, and configured to obtain electrical energy from the emergency power supply during in the emergency working mode, or obtain electrical energy from the electric supply network during in the mains power working mode;

a sensor module (42) configured to obtain a peripheral environmental status of the LED lamp drive system and output a detection signal (b22) based on the environmental status;

an LED light bead (52) electrically connected to the LED drive power supply, wherein the LED light bead is driven by the LED drive power supply to be lit up;

a drive control module (62) electrically connected to all of the emergency power supply, the sensor module and the LED drive power supply, the drive control module configured to supply power to the sensor module and obtain a detection signal (b22) of the sensor module, and output a drive regulation signal (b32) to the LED drive power supply according to the constant electrical signal (A0) and the detection signal (b22), so that the LED drive power supply drives the LED light bead to light up according to a drive mode that corresponds to the constant electrical signal (A0), wherein the drive regulation signal (b32) includes a first state (b32-1) and a second state (b32-2); and wherein the drive control module is controlled by the constant electrical signal (A0), corresponding to different working modes (A1) based on different constant electrical signals (A0), and controls an output of the drive regulation signal (b32); and wherein during in the mains power working mode (A11), the emergency power supply (12) outputs the first signal (A01) to the drive control module (62), the drive control module receives the detection signal (b22) from the sensor module (42) and outputs the drive regulation signal (b32) of the first state (b32-1) based on the detection signal (b22), so that both the LED drive power supply and the LED light bead are controlled by the sensor module; and wherein during in the emergency working mode (A12), the emergency power supply (12) outputs the second signal (A02), and the drive control module stops receiving the detection signal (b22) from the sensor module (42) and outputs the drive regulation signal (b32) of the second state (b32-2), so that both the LED drive power supply and the LED light bead are not controlled by the sensor module.

In the present disclosure, the drive control module detects the constant electrical signal that is output from the emergency power supply to determine the working state of the LED lamp drive system. When the mains power is cut off, it enters the emergency working state, at this time, the constant electrical signal is output to be the second signal, so that the drive control module that is in the emergency working mode disconnects the sensor module and outputs the drive regulation signal (b32) of the second state (b32-2) to prevent the sensor module from controlling the LED drive power supply. While, when the mains power supplies power, the emergency working state is exited, and the constant electrical signal is output to be the first signal, so that the drive control module that is in the mains power working mode connects the sensor module and outputs the drive regulation signal (b32) of the first state (b32-1), for controlling both the LED drive power supply and the LED light bead according to a control mode of the sensor module, thereby achieving flexible and variable illumination modes of the LED light bead.

DETAILED DESCRIPTION

Reference will now be made in detail to embodiments, examples of which are illustrated in the accompanying drawings.

A First Embodiment

Figure 1:
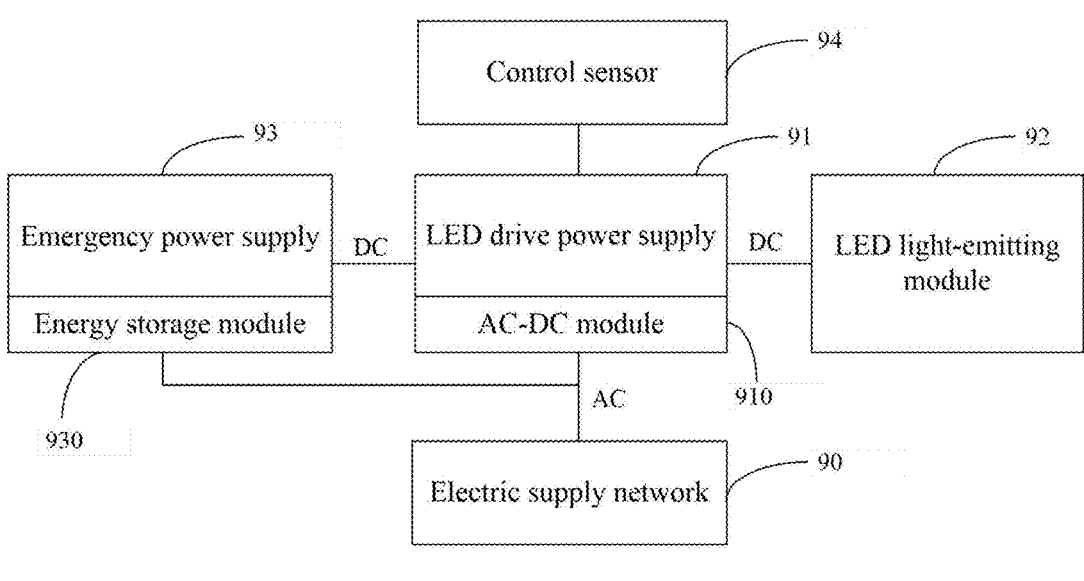
FIG. 1 is a schematic module diagram of an LED lamp drive system of the related art.
Figure 2:
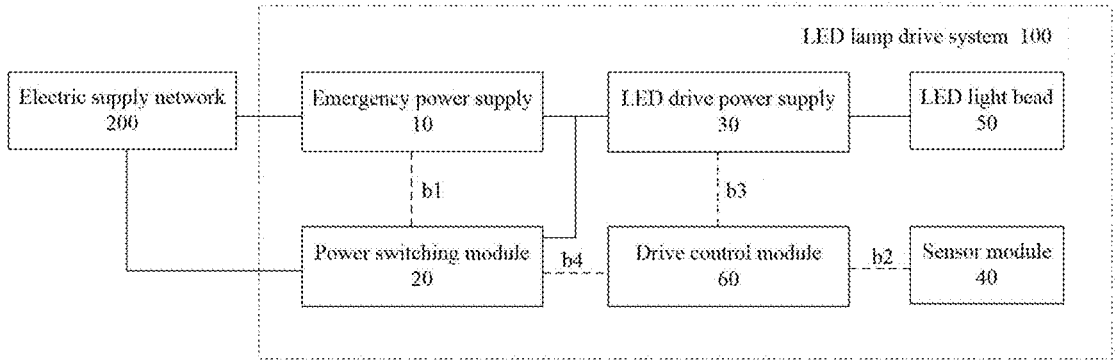
FIG. 2 is a schematic diagram of an LED lamp drive system in accordance with an embodiment of the present disclosure.

Referring to FIG. 2, an LED lamp drive system 100 with an emergency power supply thereof according to an embodiment of the present disclosure is provided. The LED lamp drive system 100 includes an emergency power supply 10. The LED lamp drive system 100 is electrically connected with an electric supply network 200 and configured to obtain electrical energy from the electric supply network 200 to drive an LED light bead 50 to light up; or the LED lamp drive system 100 is connected to the electric supply network 200 through the emergency power supply 10, and configured to obtain electrical energy from the electric supply network 200, to drive the LED light bead 50 to light up. When the electric supply network 200 is turned off, the LED lamp drive system 100 supplies power to the LED light bead 50 through the emergency power supply 10, so as to light up the LED light bead 50 for achieving an emergency illumination thereof.

The LED lamp drive system 100 further includes: a power switching module 20, an LED drive power supply 30, a sensor module 40, the LED light bead 50 and a drive control module 60.

The emergency power supply 10 is electrically connected to the electric supply network 200 and configured to obtain electrical energy from the electric supply network 200 and then store the electrical energy that is obtained, so as to transmit the stored electrical energy to the outside during in an emergency working mode A1, that is, transmitting the stored electrical energy to both the LED drive power supply 30 and the LED light bead 50.

The power switching module 20 is electrically connected to both the electric supply network 200 and the emergency power supply 10, and configured to switch a working mode A of the LED lamp drive system 100 according to an input voltage b1 of the electric supply network 200, wherein the working mode A includes the emergency working mode A1 and a mains power working mode A2.

The LED drive power supply 30 is electrically connected to both the emergency power supply 10 and the power switching module 20, and configured to obtain electrical energy from the emergency power supply 10 during in the emergency working mode A1, or obtain electrical energy from the electric supply network 200 through the emergency power supply 10 during in the mains power working mode A2.

The sensor module 40 is configured to obtain a peripheral environmental status of the LED lamp drive system 100 and output a detection signal b2 based on the environmental status.

The LED light bead 50 is electrically connected to the LED drive power supply 30 and driven by the LED drive power supply 30 to be lit up.

The drive control module 60 is electrically connected to all of the power switching module 20, the sensor module 40 and the LED drive power supply 30, and configured to obtain the detection signal b2 of the sensor module 40 and output a drive regulation signal b3 to the LED drive power supply 30 according to the detection signal b2, so that the LED drive power supply 30 drives the LED light bead 50 to light up according to a drive mode B that corresponds to the detection signal b2.

In an embodiment of the present disclosure, the drive regulation signal b3 includes a first state b3-1 and a second state b3-2, and the drive regulation signal b3 in the first state b3-1 is independent from the detection signal b2 of the sensor module 40, while the drive regulation signal b3 in the second state b3-2 corresponds to the detection signal b2.

The drive control module 60 is controlled by a mode switching signal b4 that is sent from the power switching module 20, and configured to control the drive regulation signal b3 to be the first state b3-1 or the second state b3-2 according to different working modes A that are switched by the power switching module 20. During in the emergency working mode A1, the drive control module 60 outputs the drive regulation signal b3 of the first state b3-1, so that both the LED drive power supply 30 and the LED light bead 50 are not controlled by the sensor module 40, and during in the mains power working mode A2, the drive control module 60 outputs the drive regulation signal b3 of the second state b3-2, so that both the LED drive power supply 30 and the LED light bead 50 are controlled by the sensor module 40.

In the present disclosure, a working process of the LED lamp drive system 100 is as follows.

Firstly, the power switching module 20 detects an input voltage b1 of the electric supply network 200, and the input voltage b1 is input to the emergency power supply 10. When the input voltage b1 is an electric supply, the emergency power supply 10 is in an electric supply charging state, which indicates that the entire drive system 100 is in the mains power working mode A2. Next, the power switching module 20 sends a mode switching signal b4, for example, the mode switching signal b4 is a constant voltage high level of 3 V. Afterwards, the drive control module 60 starts working according to the mode switching signal b4 in a condition of a high level effective preset mode. The drive control module 60 communicates with the sensor module 40 and obtains the detection signal b2 from the sensor module 40. The detection signal b2 here is not completely the same depending on the sensor module 40, but the detection signals b2 is a control signal that is sent from the sensor module 40 and reaches a detection threshold after the surrounding environment of the LED lamp drive system 100 is detected. For example, an infrared sensor or a radar sensor is configured to detect a triggering signal when a moving object approaches within a detection range, or a photosensitive sensor is configured to detect the triggering signal when an ambient light intensity within the detection range drops below a threshold. Finally, when the sensor module 40 sends the detection signal b2 to the drive control module 60, the drive control module 60 outputs the drive regulation signal b3 of the second state b3-2 that corresponds to the detection signal b2 to the LED drive power supply 30, so that the LED drive power supply 30 drives the LED light bead 50 to light up according to a driving mode B that corresponds to the detection signal b2.

In the present disclosure, the driving mode B can include a plurality of types, and each driving mode B at least corresponds to one detection signal b2 and one drive regulation signal b3. The detection signal b2 and the drive regulation signal b3 often present a one-to-one correspondence relationship based on different specific signals and values. For example, when the detection signal b2 indicates that a detection person is approaching, the drive regulation signal b3 is represented to be a PWM signal of a first frequency, a first current and a first duty cycle, at this time, when the drive regulation signal b3 is transmitted to the LED drive power supply 30, the LED drive power supply 30 drives the LED light bead 50 to light up at a full power according to the PWM signal of the first frequency, the first current and the first duty cycle, to provide maximum brightness illumination, at this time, the highest illumination intensity is occurred in the LED light bead 50. When the detection signal b2 indicates that the detection person is away, the drive regulation signal b3 is represented as the PWM signal of a second frequency, a second current and a second duty cycle. At this time, when the drive regulation signal b3 is transmitted to the LED drive power supply 30, the LED drive power supply 30 drives the LED light bead 50 to light up according to the PWM signal of the second frequency, the second current and the second duty cycle. At this time, a cycle of the second frequency is increased, and after two seconds, the second frequency is changed to the low level and continues until a next detection signal b2 is triggered. The second current is smaller than the first current, and the second duty cycle is smaller than the first duty cycle. At this point, the illumination mode represented by the LED light bead 50 is: when a person moves away, the full power illumination is switched to a low power illumination and a low brightness illumination, and continue the low power illumination for two seconds before being turned off.

Therefore, based on the above, it can be seen that during in the mains power working mode, the LED drive power supply 30 can provide differentiated and customized illumination modes according to the detection signal of the sensor module 40.

Figure 3:
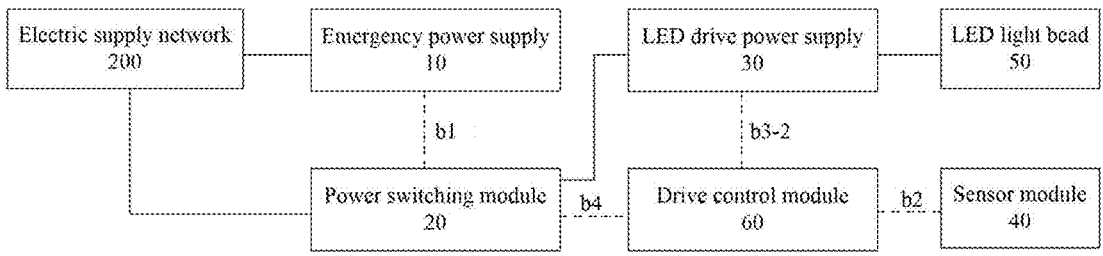
FIG. 3 is a schematic diagram of an LED lamp drive system that works in a mains power working mode of the present disclosure.

Referring to FIG. 3, FIG. 3 is a schematic diagram of working modules of the LED lamp drive system 100 during in the mains power working mode A2. At this time, the drive control module 60 drives the LED light bead 50 to light up according to a corresponding illumination mode through the LED drive power supply 30 based on the control of the sensor module 40; at the same time, the electric supply network 200 supplies power to the LED drive power supply 30 through the power switching module 20. At this time, the emergency power supply 10 itself is only in the charging state, rather than providing electrical energy.

In addition, the LED lamp drive system 100 of the present disclosure has another working mode, which is as follows.

Firstly, the power switching module 20 detects the input voltage b1 of the electric supply network 200, and the input voltage b1 is input to the emergency power supply 10. When the input voltage b1 is detected to be absent or an output is zero, it is indicated that the emergency power supply 10 is in the emergency power supply state, and at this time, the entire drive system 100 works in the emergency working mode A1. Next, the power switching module 20 sends the mode switching signal b4, for example, the mode switching signal b4 is a constant voltage low level of 0 V. Afterwards, the drive control module 60 that is in the high-level effective preset mode stops communication with the sensor module 40 based on the low-level mode switching signal b4. Without the detection signal b2 inputting from the sensor module 40, the drive control module 60 outputs the drive regulation signal b3 of the first state b3-1 to the LED drive power supply 30, so that the LED drive power supply 30 no longer drives the LED light bead 50 to light up according to the driving mode B that corresponds to the detection signal b2. During in the emergency working state A1, the drive regulation signal b3 of the first state b3-1 that is output becomes a fixed signal, such as a fixed high-level signal or a PWM signal of a fixed frequency. At this time, the LED drive power supply 30 obtains electric energy from the emergency power supply 10 to directly drive the LED light bead 50 to light up, rather than being controlled by the sensor module 40, and the LED light bead 50 is in a continuous illumination state.

Figure 4:
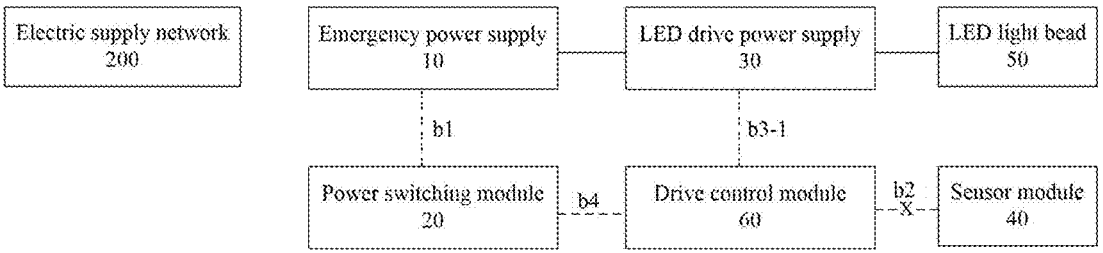
FIG. 4 is a schematic diagram of an LED lamp drive system that works in an emergency working mode of the present disclosure.

Referring to FIG. 4, FIG. 4 is a schematic diagram of working modules of the LED lamp drive system 100 that is in the emergency working mode A1. At this time, the drive control module 60 no longer receives the detection signal b2 from the sensor module 40. The LED drive power supply 30 drives the LED light bead 50 according to the drive regulation signal b3 of the first state b3-1 of the drive control module 60. At the same time, the emergency power supply 10 supplies power to the LED drive power supply 30, and the emergency power supply 10 itself is only in a discharged state.

In the present disclosure, the power switching module 20 can switch the working mode A of the LED lamp drive system 100 in real time according to different input voltages b1 that are detected. When the input voltage b1 is the electric supply, the mode switching signal b4 is output, so that both the drive control module 60 and the sensor module 40 start working. The drive regulation signal b3 output from the drive control module 60 controls the LED drive power supply 30 to drive the LED light bead 50 to light up according to the detection signal b2 of the sensor module 40. When the input voltage b1 is absent, that is, when the electric supply 200 is powered off, the power switching module 20 outputs the mode switching signal b4, so that the drive control module 60 disconnects from the sensor module 40. The drive control module 60 outputs the drive regulation signal b3 of the first state b3-1, so that the LED drive power supply 30 directly drives the LED light bead 50 to light up, rather than being controlled by the sensor module 40. The power switching module 20 can directly switch between two working modes.

In the present disclosure, during in the mains power working mode A2, the LED drive power supply 30 is powered by the electric supply network 200. While, during in the emergency working mode A1, the LED drive power supply 30 is powered by the emergency power supply 10, and the power switching module 20 is also configured to switch the power supply mode of the LED drive power supply 30, when the power switching module 20 detects the input power supply b1 to switch the working mode thereof.

Figure 5:
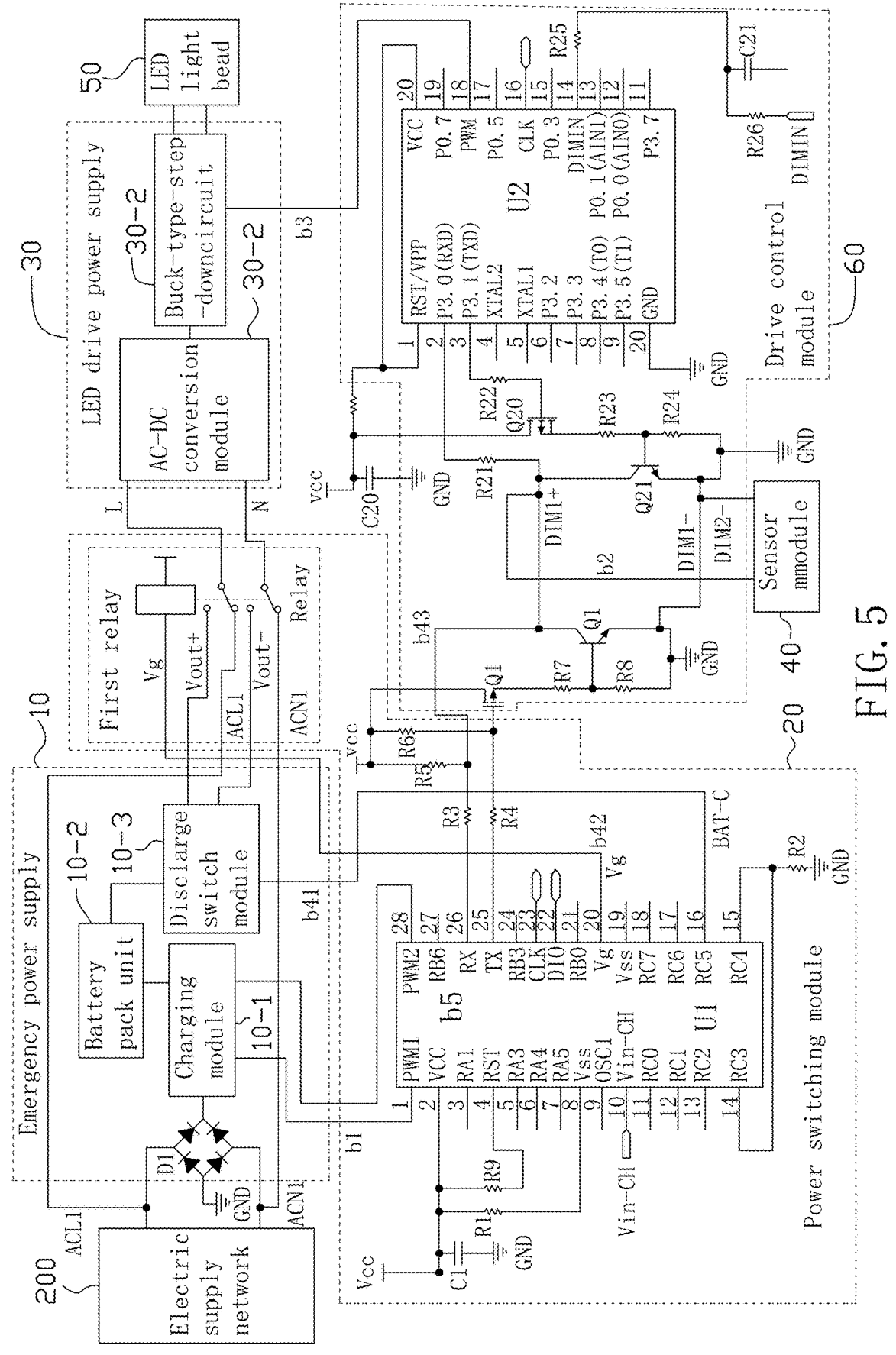
FIG. 5 is a circuit diagram of an LED lamp drive system of the present disclosure.

Referring to FIG. 5, FIG. 5 is a circuit schematic diagram of an embodiment of the present disclosure, the LED lamp drive system of the present disclosure will be described below in conjunction with the circuit schematic diagram.

In the circuit, the emergency power supply 10 includes a charging module 10-1, a battery pack unit 10-2 and a discharge switch module 10-3.

The charging module 10-1 is electrically connected between the electric supply network 200 and the battery pack unit 10-2, and during in the mains power working mode A2, the electric supply network 200 is configured to supplement electrical energy to the battery pack unit 10-2 through the charging module 10-1.

The discharge switch module 10-3 is electrically connected to the battery pack unit 10-2, and during in the emergency working mode A1, the discharge switch module 10-3 is controlled to enable the battery pack unit 10-2 to supply power to the LED drive power supply 30 for obtaining emergency illumination thereof.

In an embodiment of the present disclosure, the power switching module 20 includes: a first microcontroller U1 and a first relay Relay. The first microcontroller U1 is configured to detect the detection signal b1 and determine whether the emergency power supply 10 is in a supplementary power state, form an emergency detection signal b5, and output the mode switching signal b4 according to the emergency detection signal b5. The mode switching signal b4 includes a discharge control signal b41, a relay control signal b42 and a communication control signal b43.

The first relay Relay includes two pairs of input terminals that are first input terminals ACL1, ACN1 and second input terminals Vout+, Vout−, the pair of first input terminals ACL1, ACN1 electrically connected to the electric supply network 200, and the pair of second input terminals Vout+, Vout-electrically connected to the discharge switch module 10-3.

In an embodiment of the present disclosure, the discharge control signal b41 is configured to control the discharge switch module 10-3 to work, the relay control signal b42 configured to control the first relay Relay to work, and enable output terminals (L, N) of the first relay Relay to electrically connect to the pair of first input terminals ACL1, ACN1 or the pair of second input terminals Vout+, Vout−. The communication control signal b43 is transmitted to the drive control module 60 for controlling whether the drive control module 60 receives the detection signal b2 of the sensor module 40, and outputs the drive regulation signal b3 of the first state b3-1 or the second state b3-2, in order to control whether the LED light bead 50 works according to the detection signal b2 of the sensor module 40.

In the present disclosure, the drive control module 60 further includes a second microcontroller U2 that includes a first pin RXD, a second pin TXD and a third pin PWM. The first microcontroller U1 further includes a fourth pin RX and a fifth pin TX. Both the first microcontroller U1 and the second microcontroller U2 form a control circuit for controlling whether the communication control signal b43 is connected to the second microcontroller U2 through that a first MOS transistor Q1 and a second MOS transistor Q20 are connected to each other, and a first triode Q2 and a second triode Q21 are connected to each other. A specific connection way of the control circuit is as follows.

First, the fourth pin RX is electrically connected to the first pin RXD through resistors R3 and R21.

Second, a positive input terminal DIM2+ of the sensor module 40 and a resistor R5 are respectively connected between the resistor R3 and the resistor R21. A collector of the first triode Q2, a collector of the second triode Q21 and an end of the resistor R5 are connected to a constant voltage source VCC.

Third, the fifth pin TX is connected to a gate of the first MOS transistor Q1 through a resistor R4, a source of the first MOS transistor Q1 is connected to the constant voltage source VCC, and a drain of the first MOS transistor Q1 is grounded through resistors R7, R8 in turn. A base of the first triode Q2 is electrically connected between a resistor R7 and a resistor R8, and an emitter of the first triode Q2 is sequentially grounded and connected to a negative input terminal DIM2− of the sensor module 40 and an emitter of the second triode Q21.

Fourth, the second pin TXD is connected to a gate of the second MOS transistor Q20 through a resistor R22, a source of the second MOS transistor Q20 is connected to the constant voltage source VCC, and a drain of the second MOS transistor Q21 is grounded through resistors R23, R24.

A base of the second triode Q21 is connected between the resistor R23 and the resistor R24.

Fifth, the third pin PWM is connected to the LED driver power supply 30.

The LED drive power supply 30 includes a Buck-type step-down circuit (English name: Buck Converter) 30-1 electrically connected to the LED light bead 50, and controlled by the drive regulation signal b3 to change a drive voltage of the LED light bead 50 for adjusting an illumination mode of the LED light bead 50. In the circuit as shown in FIG. 5, the third pin PWM is configured to output the drive regulation signal b3, and connected to the Buck-type step-down circuit 30-1. The Buck-type step-down circuit 30-1 is a PWM drive signal that is controlled to output a square wave, and configured to adjust a duty cycle and a current of the PWM square wave that is output according to the drive regulation signal b3 that is input, thereby adjusting a luminous intensity of the LED light bead 50.

In an embodiment of the present disclosure, when the discharge switch module 10-3 supplies power to the LED drive power supply 30, the discharge switch module 10-3 is configured to invert a DC (direct current) low voltage of the battery pack unit 10-2 into a DC high voltage and then output the DC high voltage. The LED drive power supply 30 further includes an AC-DC conversion module 30-2 configured to convert an AC (alternating current) voltage that is transmitted from the electric supply network 200 into a DC voltage or a DC current to drive the light LED light bead 50.

After the above circuit explanation, a working process of the circuit diagram is as follows.

Firstly, when the electric supply network 200 outputs a mains voltage, the mains voltage passes through a rectifier bridge D1 and the charging module 10-1, and charges the battery pack unit 10-2 in a direct current manner. At the same time, the input voltage b1 of the charging module 10-1 is detected as the mains voltage. At this time, the LED lamp drive system 100 is in the mains power working mode A2. The first microcontroller U1 outputs the relay control signal b42 through a pin Vg. The relay control signal b42 controls the first relay Relay to conduct the output terminals L, N with the first input terminals ACL1, ACN1. At this time, the electrical energy of the electric supply network 200 is directly transmitted to the LED drive power supply 30 at the back end through the first input terminals ACL1, ACN1. At the same time, the first microcontroller U1 outputs the discharge control signal b41 through a pin RC5, the discharge control signal b41 controls the discharge switch module 10-3 to be in a closed state, at this time, the battery pack unit 10-2 is in a charging state, so that the battery pack unit 10-2 can't discharge to the LED drive power supply 30 through the discharge switch module 10-3.

At the same time, the fifth pin TX outputs the low level, and the first MOS transistor Q1 is turned off. At this time, the base of the first triode Q2 is grounded at the low level, and the first triode Q2 is turned off; at the same time, the second pin TXD also outputs the low level, and the second MOS transistor Q20 is turned off. At this time, the base of the second triode Q21 is grounded at the low level, and the second triode Q21 is turned off. The fourth pin RX sends a constant voltage, the constant voltage is input to the first pin RXD of the second microcontroller U2 by superimposing with the detection signal b2 that is output from the sensor module 40. When the first pin RXD receives the detection signal b2, the third pin PWM outputs the drive regulation signal b3 that corresponds to the detection signal b2, that is, the drive regulation signal b3 of the second state b3-2, so that the LED drive power supply 30 controls the LED light bead 50 to light up according to the drive regulation signal b3, thereby realizing a control of the sensor module 40.

Another working state of the circuit is.

When the electric supply network 200 is turned off and the input voltage b1 is detected to be zero, the emergency detection signal b5 corresponds to a non-supplementary power state, and the LED lamp drive system 100 is in the emergency working mode A1. The first microcontroller U1 outputs the relay control signal b42 through the pin Vg, and the relay control signal b42 controls the first relay Relay to conduct the output terminals L, N with the second input terminals Vout+, Vout−. At the same time, the first microcontroller U1 outputs the discharge control signal b41 through a pin RC5, and the discharge control signal b41 controls the discharge switch module 10-3 to be in a working state, at this time, the battery pack unit 10-2 is in a discharge state, so that electric energy of the battery pack unit 10-2 is supplied to the LED drive power supply 30 through the discharge switch module 10-3 and the first relay Relay.

At the same time, the fifth pin TX outputs the high level, and the first MOS transistor Q1 is turned on. At this time, a voltage of the constant voltage source VCC is loaded between the resistor R7 and the resistor R8, at this time, the base of the first triode Q2 is at the high level, and the first triode Q2 is turned on. At the same time, the second pin TXD also outputs the high level, and the second MOS transistor Q20 is turned on. At this time, the base of the second triode Q21 is at the high level, and the second triode Q21 is turned on. In this way, the fourth pin RX sends the constant voltage, and the detection signal b2 that is output from the sensor module 40 is forcibly grounded, that is, the clamp is grounded at the low level. At this time, the detection signal b2 that is output from the sensor module 40 can't be input to the second microcontroller U2, and the first pin RXD is also forcibly pulled to the low level. At this time, the output terminal of the second microcontroller U2, that is, the third pin PWM, outputs the drive regulation signal b3 of the first state b3-1. The drive regulation signal b3 of the first state b3-1 is independent from the detection signal b2 of the sensor module 40, which can be the PWM signal with a constant frequency. At this time, the LED drive power supply 30 is not controlled by the sensor module 40, thereby achieving a purpose of isolating the sensor module 40 in the emergency working state.

A Second Embodiment

Figure 6:
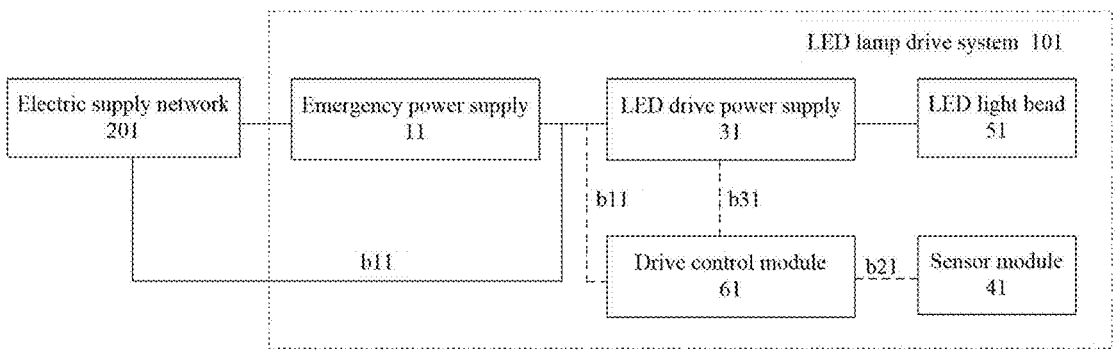
FIG. 6 is a schematic diagram of an LED lamp drive system in accordance with another embodiment of the present disclosure.

Referring to FIG. 6, an LED lamp drive system with an emergency power supply thereof according to another embodiment of the present disclosure is provided. The LED lamp drive system 101 is electrically connected with an electric supply network 201 and configured to obtain electrical energy from the electric supply network 201.

The LED lamp drive system 101 includes an emergency power supply 11, a power switching module 21, an LED drive power supply 31, a sensor module 41, an LED light bead 51 and a drive control module 61.

The emergency power supply 11 is electrically connected to the electric supply network 201 and configured to obtain electrical energy from the electric supply network 201 and then store the electrical energy that is obtained, so as to transmit the stored electrical energy to the outside during in an emergency working mode A11. The power switching module 21 is electrically connected to both the electric supply network 201 and the emergency power supply 11, and configured to switch a working mode A1 of the LED lamp drive system 101 according to an input voltage b11 of the electric supply network 201, wherein the working mode A1 includes the emergency working mode A11 and a mains power working mode A21.

The LED drive power supply 31 is electrically connected to both the emergency power supply 11 and the power switching module 21, and configured to obtain electrical energy from the emergency power supply 11 during in the emergency working mode A11, or obtain electrical energy from the electric supply network 201 through the emergency power supply 11 during in the mains power working mode A12. The sensor module 41 is configured to obtain a peripheral environmental status of the LED lamp drive system 101 and output a detection signal b21 based on the environmental status. The LED light bead 51 is electrically connected to the LED drive power supply 31 and driven by the LED drive power supply 31 to be lit up.

The drive control module 61 is electrically connected to all of the input terminals ACL/ACN of the LED drive power supply 31, the sensor module 41 and the LED drive power supply 31, and configured to obtain the detection signal b21 of the sensor module 41 and output a drive regulation signal b31 to the LED drive power supply 31 according to the detection signal b21, so that the LED drive power supply 31 drives the LED light bead 51 to light up according to a drive mode B that corresponds to the detection signal b21.

In an embodiment of the present disclosure, the drive regulation signal b31 includes a first state b31-1 and a second state b31-2, and the drive regulation signal b31 in the first state b31-1 is independent from the detection signal b21 of the sensor module 41, while the drive regulation signal b31 in the second state b31-2 corresponds to the detection signal b21.

The drive control module 61 is controlled by the input voltage b11 of the LED drive power supply 31, corresponding to different working modes A1 according to different input voltages b11, and controls the drive regulation signal b31 to be the first state b31-1 or the second state b31-2. During in the emergency working mode A11, the drive control module 61 outputs the drive regulation signal b31 of the first state b31-1, so that both the LED drive power supply 31 and the LED light bead 51 are not controlled by the sensor module 41.

The input voltage b11 includes an AC voltage from the electric supply network 201 or a DC voltage from the emergency power supply 11.

Figure 7:
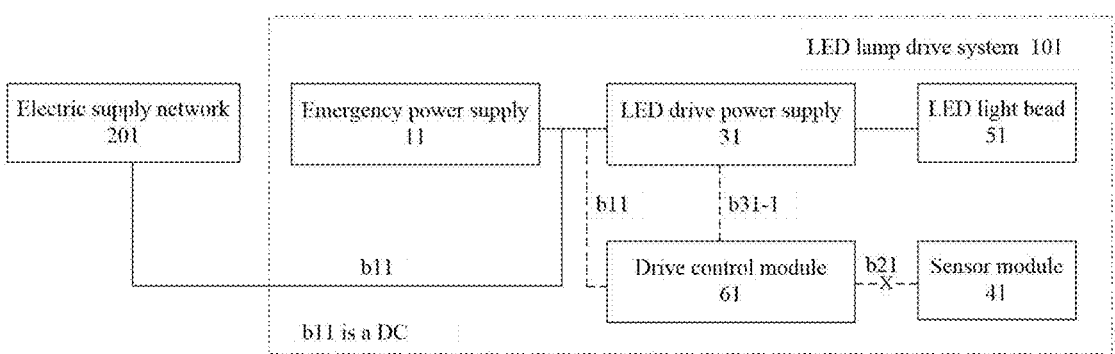
FIG. 7 is a schematic diagram of the LED lamp drive system of FIG. 6 that works in an emergency working mode.

Referring to FIG. 7, when the input voltage b11 is the DC voltage, the drive control module 61 isolates the detection signal b21 and outputs the drive regulation signal b31 of the first state b31-1 that is unrelated to the detection signal b21.

Figure 8:
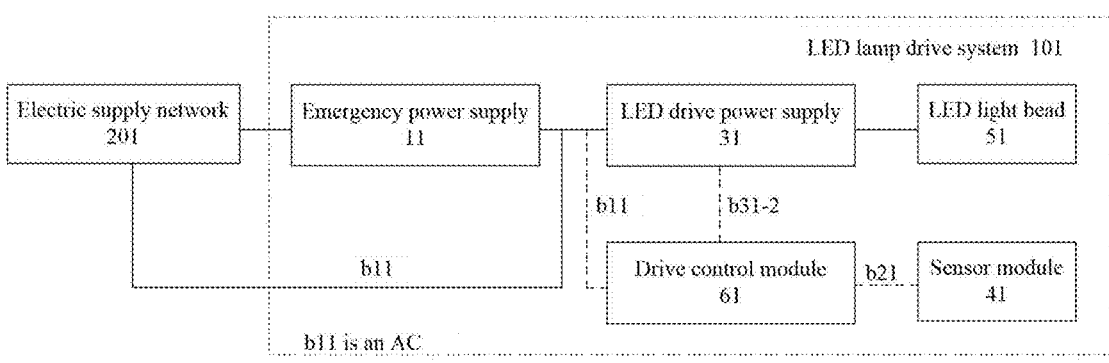
FIG. 8 is a schematic diagram of the LED lamp drive system of FIG. 6 that works in a mains power working mode.

Referring to FIG. 8, when the input voltage b11 is the AC voltage, the drive control module 61 receives the detection signal b21 of the sensor module 41 to output the drive regulation signal b31 of the second state b31-2 that corresponds to the detection signal b21.

In an embodiment of the present disclosure, the drive control module 61 determines whether the current drive system 101 is in the mains power working mode A21 or the emergency working mode A11 based on whether an voltage of the input terminal of the LED drive power supply 31 is a DC voltage or an AC voltage, and outputs a corresponding drive regulation signal b31 of the first state b31-1 or the second state b31-2, so as to stop inputting the detection signal b21 of the sensor module 41 during in the emergency working mode A11, thereby isolating the sensor module 41 during in the emergency working mode A11.

Figure 9:
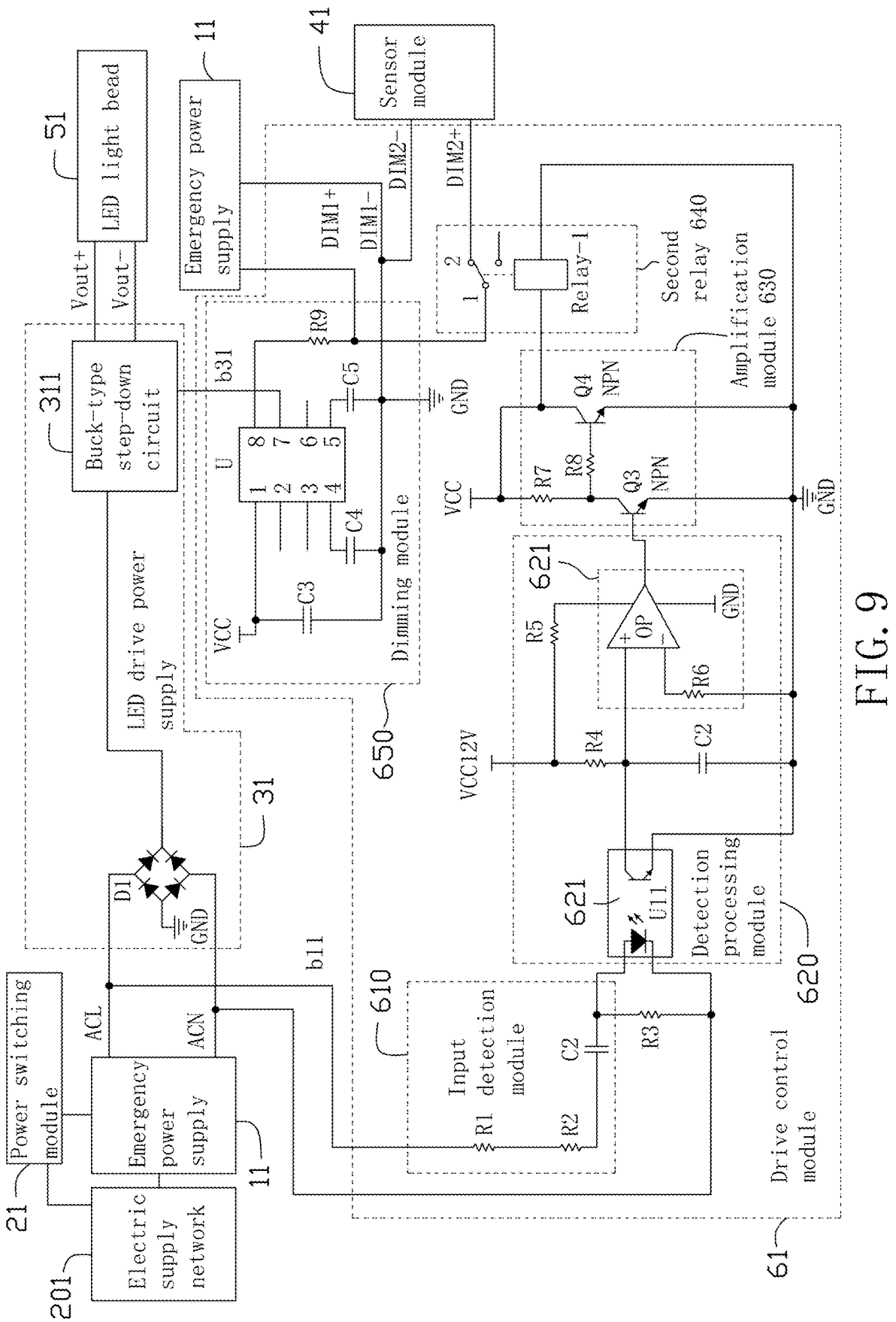
FIG. 9 is a circuit diagram of the LED lamp drive system of FIG. 6.

Referring to FIG. 9, the sensor module 41 includes a pair of input terminals DIM2−, DIM2+ and a pair of output terminals DIM1+, DIM1−, and the drive control module 61 includes: an input detection module 610, a detection processing module 620, an amplification module 630, a second relay 640 and a dimming module 650.

The input detection module 610 is configured to detect the input voltage b11 of the input terminals ACL/ACN of the LED drive power supply 31 to determine whether the input voltage b11 is the DC voltage or the AC voltage, and output a high level or a low level. The detection processing module 620 is configured to process the high level or the low level that is output from the input detection module 610 to obtain impedance matching, backend isolation and anti-interference thereof. The amplification module 630 is configured to amplify the high level or the low level that is output from the detection processing module 620. The second relay 640 is configured to receive the high level or the low level that is sent from the amplification module 630, and perform an on operation or an off operation according to the high level or the low level. The input terminals DIM2−, DIM2+ are electrically connected to the second relay 640, the sensor module 41 configured to turn on or turn off the input terminals DIM2−, DIM2+ according to a control of the second relay 640. The dimming module 650 is electrically connected to all the output terminals DIM1−, DIM1+, the second relay 640 and the LED drive power supply 31.

When the input terminals DIM2−, DIM2+ are connected to the dimming module 650 under a control of the second relay 640, the LED lamp drive system 101 is in the mains power working mode A21, and the sensor module 41 outputs the detection signal b21 to the dimming module 650, and when the pair of input terminals DIM2−, DIM2+ are disconnected under the control of the second relay 640, the LED lamp drive system 101 is in the emergency working mode A11, and the sensor module 41 stops outputting the detection signal b21 to the dimming module 650.

The dimming module 650 outputs the drive regulation signal b31 of the first state b31-1 or the second state b31-2 to the LED drive power supply 31 based on whether the detection signal b21 is input. When the detection signal b21 is stopped inputting to the dimming module 650, the dimming module 650 outputs the drive regulation signal b31 of the first state b31-1 to the LED drive power supply 31. Otherwise, the dimming module 650 outputs the drive regulation signal b31 of the second state b31-2 to the LED drive power supply 31.

In an embodiment of the present disclosure, the output terminals DIM1−, DIM1+ are also connected to the emergency power supply 11, which synchronously control an output of the emergency power supply 11 during in the emergency working state A11, so that the LED light bead 51 is not controlled by the sensor module 41.

Referring to FIG. 9, the detection processing module 620 includes: a coupling module 621 and a voltage comparison following module 622.

The coupling module 621 is configured to receive the high level or the low level of the input detection module 610 and output a control signal after performing the impedance matching and the backend isolation thereof. The voltage comparison following module 622 is configured to receive the control signal and perform anti-interference processing on the control signal and then output the control signal that has been performed anti-interference processing.

The input detection module 610 is connected to a RC circuit of the input terminals of the LED drive power supply 31, the RC circuit configured to isolate the direct current and conduct the alternating current, detect an output as the high level when the input terminals of the LED drive power supply 31 is the AC voltage, and detect the output as the low level when the input terminals of the LED drive power supply 31 is the DC voltage.

The coupling module 621 is an optical coupling element U11 configured to flip the input high level to the low level, flip the input low level to the high level, and then output to the voltage comparison following module 622.

The voltage comparison following module 622 is an operational amplifier OP that forms an in-phase operational amplification circuit.

An output terminal of the operational amplifier OP is connected to the amplification module 630, and the amplification module 630 includes a third triode Q3 and a fourth triode Q4.

A base of the third triode Q3 is connected to the output terminal of the operational amplifier OP, a collector of the third triode Q3 connected to the constant voltage source VCC, an emitter of the third triode Q3 grounded and connected to a negative phase input terminal of the operational amplifier OP. A base of the fourth triode Q4 is electrically connected to the collector of the third triode Q3, a collector of the fourth triode Q4 electrically connected to the constant voltage source VCC, and an emitter of the fourth triode Q4 grounded. The collector of the fourth triode Q4 is an amplifying output terminal connected to the second relay 640 to control the second relay 640 to be turned on and turned off.

In an embodiment of the present disclosure, the LED drive power supply 31 includes a Buck-type step-down circuit (Buck Converter) 311 electrically connected to the LED light bead 51, and controlled by the drive regulation signal b31 to change a drive current of the LED light bead 51 for adjusting an illumination mode of the LED light bead 51.

The present disclosure can flexibly switch the input terminals DIM2−, DIM2+ of the sensor module 41 to be turned on and turned off, that are controlled by the second relay 640 at the back end, based on whether the input voltage b11 is the AC voltage or the DC voltage, so as to conveniently connect and isolate the sensor module 41 to adapt to the mains power working mode or the emergency working mode. The relay of the present disclosure is provided to control, which has a low cost and high reliability thereof.

A Third Embodiment

Figure 10:
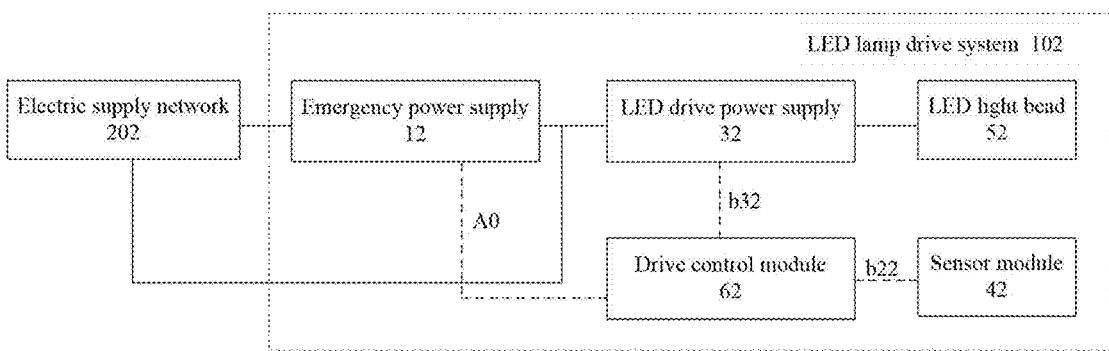
FIG. 10 is a schematic diagram of an LED lamp drive system in accordance with another embodiment of the present disclosure.

Referring to FIG. 10, an LED lamp drive system with an emergency power supply thereof according to another embodiment of the present disclosure is provided. The LED lamp drive system 102 is electrically connected with an electric supply network 202 and configured to obtain electrical energy from the electric supply network 202, wherein the LED lamp drive system 102 includes an emergency working mode A12 and a mains power working mode A22.

The LED lamp drive system 102 includes an emergency power supply 12, a power switching module 22, an LED drive power supply 32, a sensor module 42, an LED light bead 52 and a drive control module 62.

The emergency power supply 12 electrically connected to the electric supply network 202 and configured to obtain electrical energy from the electric supply network 202 and then store the electrical energy that is obtained, so as to transmit the stored electrical energy to the outside during in the emergency working mode A12, wherein the emergency power supply 12 is further configured to output a constant electrical signal A0 that includes a first signal A01 and a second signal A02 different from each other, the first signal A01 is a DC voltage of 12 V, and the second signal A02 is an output voltage of 0 V.

The power switching module 22 is electrically connected to both the electric supply network 202 and the emergency power supply 12, and configured to switch a working mode A1 of the LED lamp drive system 102 to be the emergency working mode A12 or the mains power working mode A22 by using the constant electrical signal A0 according to an input voltage b11 of the electric supply network 202.

The LED drive power supply 32 is electrically connected to both the emergency power supply 12 and the power switching module 22, and configured to obtain electrical energy from the emergency power supply 12 during in the emergency working mode A12, or obtain electrical energy from the electric supply network 202 during in the mains power working mode A22.

The sensor module 42 is configured to obtain a peripheral environmental status of the LED lamp drive system 102 and output a detection signal b22 based on the environmental status. The LED light bead 52 is electrically connected to the LED drive power supply 32, and driven by the LED drive power supply 32 to be lit up.

The drive control module 62 is electrically connected to all of the emergency power supply 12, the sensor module 42 and the LED drive power supply 32, the drive control module 62 configured to supply power to the sensor module 42 and obtain a detection signal b22 of the sensor module 42, and output a drive regulation signal b32 to the LED drive power supply 32 according to the constant electrical signal A0 and the detection signal b22, so that the LED drive power supply 32 drives the LED light bead 52 to light up according to a drive mode that corresponds to the constant electrical signal A0, wherein the drive regulation signal b32 includes a first state b32-1 and a second state b32-2.

The drive control module 62 is controlled by the constant electrical signal A0, corresponding to different working modes A1 based on different constant electrical signals A0, and controls an output of the drive regulation signal b32.

Figure 11:
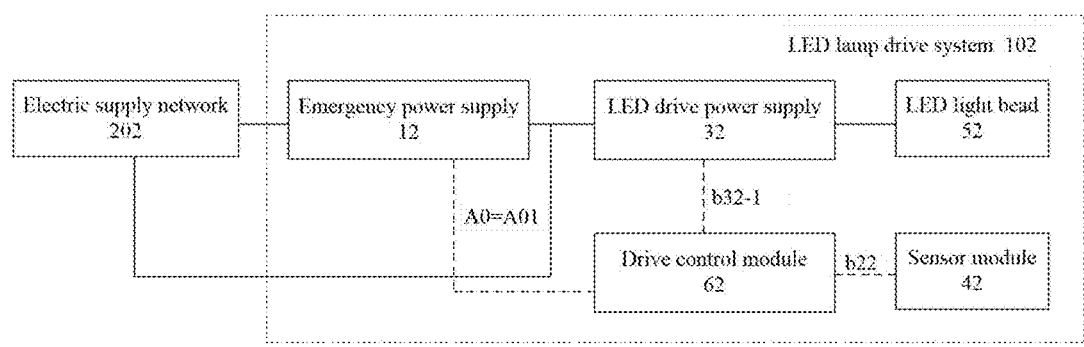
FIG. 11 is a schematic diagram of the LED lamp drive system of FIG. 10 that works in a mains power working mode.

Referring to FIG. 11, during in the mains power working mode A11, the emergency power supply 12 outputs the first signal A01 to the drive control module 62, the drive control module 62 receives the detection signal b22 from the sensor module 42 and outputs the drive regulation signal b32 of the first state b32-1 based on the detection signal b22, so that the LED drive power supply 32 and the LED light bead 52 are controlled by the sensor module 42.

Figure 12:
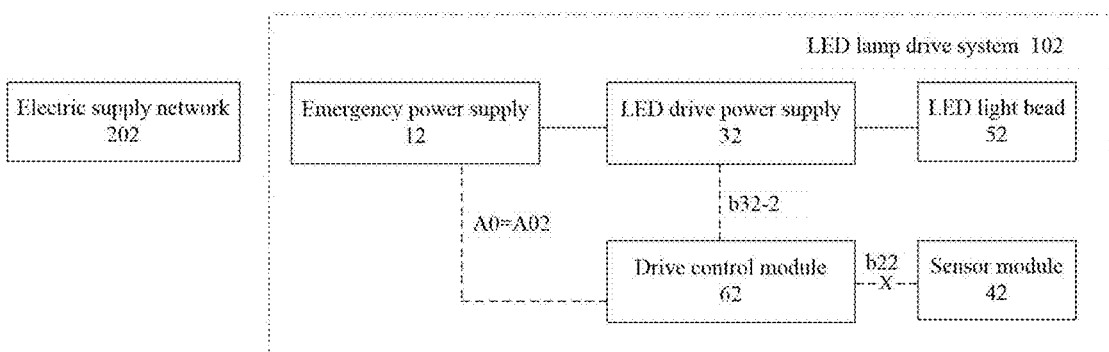
FIG. 12 is a schematic diagram of the LED lamp drive system of FIG. 10 that works an emergency working mode.

Referring to FIG. 12, during in the emergency working mode A12, the emergency power supply 12 outputs the second signal A02, and the drive control module 62 stops receiving the detection signal b22 from the sensor module 42 and outputs the drive regulation signal b32 of the second state b32-2, so that both the LED drive power supply 32 and the LED light bead 52 are not controlled by the sensor module 42.

Figure 13:
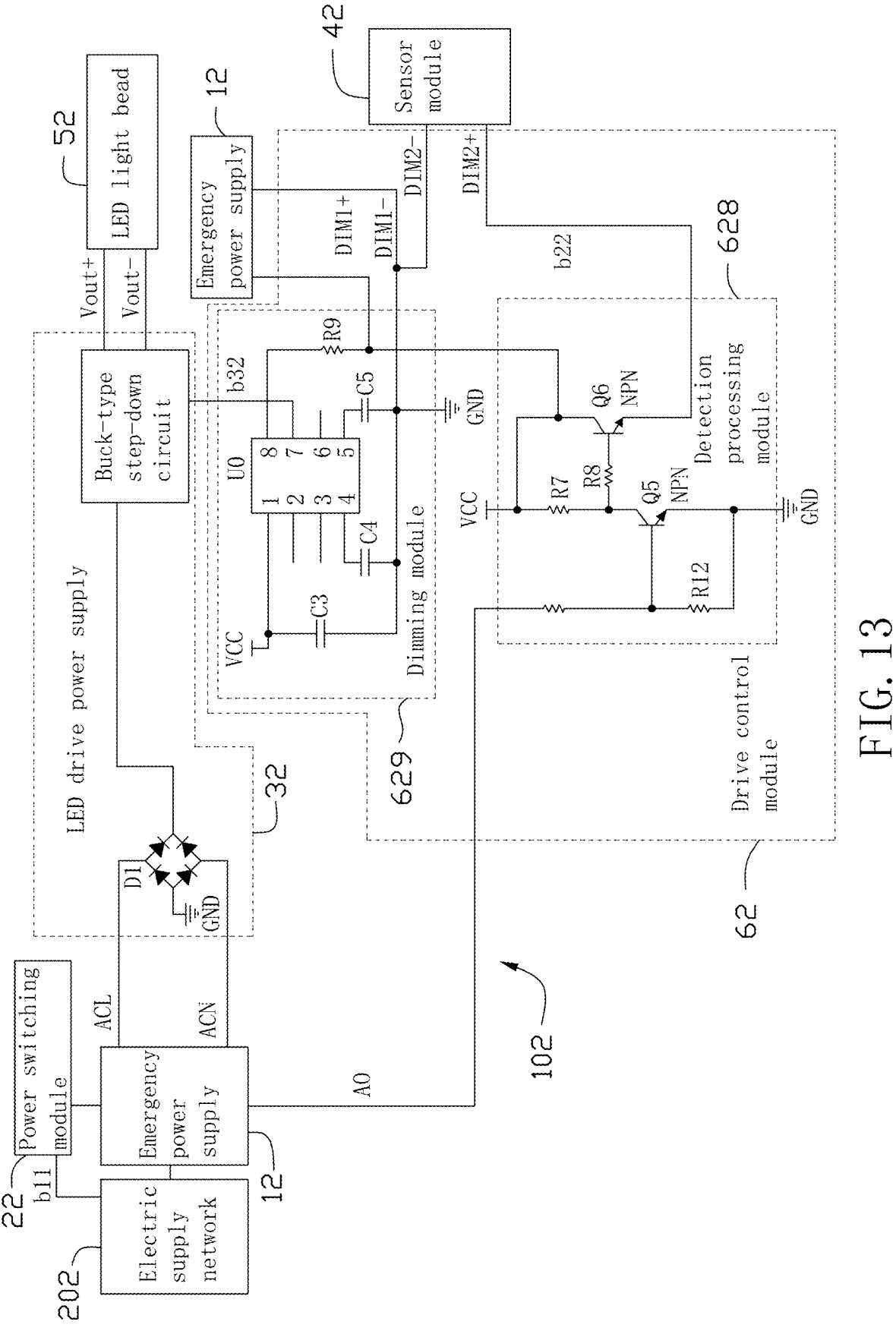
FIG. 13 is a circuit diagram of the LED lamp drive system of FIG. 10.

Referring to FIG. 13, the drive control module 62 includes a detection processing module 628 and a dimming module 629.

The detection processing module 628 is configured to detect the constant electrical signal A0 to determine whether the constant electrical signal A0 is in the first signal A01 or the second signal A02, and to control the detection signal b22 of the sensor module 42 to be input to the drive control module 62 or be stopped inputting to the drive control module 62. The dimming module 629 is electrically connected to all of the detection processing module 628, the sensor module 42 and the LED drive power supply 32, wherein the detection processing module 628 controls the dimming module 629 to receive or stop receiving the detection signal b22 that is sent from the sensor module 42.

When the detection processing module 628 receives the first signal A01 that is output from the emergency power supply 12, the detection processing module 628 controls the dimming module 629 to receive the detection signal b22, and the dimming module 629 is configured to output the drive regulation signal b32 of the first state b32-1 to the LED drive power supply 32, so that both the LED drive power supply 32 and the LED light bead 52 are controlled by the sensor module 42. When the detection processing module 628 receives the second signal A02 that is output from the emergency power supply 12, the detection processing module 628 controls the dimming module 629 to stop receiving the detection signal b22, and the dimming module 629 is configured to output the drive regulation signal b32 of the second state b32-2 to the LED drive power supply 32, so that both the LED drive power supply 32 and the LED light bead 52 are not controlled by the sensor module 42.

In an embodiment of the present disclosure, when the emergency power supply 12 works in the mains power working mode A22, the constant electrical signal A0 that is output from the emergency power supply 12 is the first signal A01, which is the DC constant voltage of 12 V. At this time, the detection processing module 628 controls the dimming module 629 to receive the detection signal b22 of the sensor module 42. The dimming module 629 outputs the drive regulation signal b32 of the first state b32-1 that corresponds to the detection signal b22 based on the detection signal b22. At this time, the LED drive power supply 32 drives the LED light bead 52 to light up according to a detection result of the sensor module 42, and the LED light bead 52 works according to the driving mode that is controlled by the sensor module 42.

When the emergency power supply 12 works in the emergency working mode A12, the constant voltage A0 that is output from the emergency power supply 12 is the second signal A02, which is the DC constant voltage of 0 V. At this time, the detection processing module 628 controls the dimming module 629 to disconnect from the sensor module 42, so as not to receive the detection signal b22. The dimming module 629 outputs the drive regulation signal b32 of the second state b32-2 that is independent from the detection signal b22. At this time, the LED drive power supply 32 works according to the drive regulation signal b32, so that the LED light bead 52 does not work according to the driving mode that is controlled by the sensor module 42.

Referring to FIG. 13, in an embodiment of the present disclosure, the detection processing module 628 includes a fifth triode Q5 and a sixth triode Q6.

A polarity of the fifth triode Q5 is different from that of the sixth triode Q6. The fifth triode Q5 is an NPN triode, while the sixth triode Q6 is a PNP triode. Therefore, a base of the fifth triode Q5 is conducted at a high level, while a base of the sixth triode Q6 is conducted at a low level.

In an embodiment of the present disclosure, the base of the fifth triode Q5 is configured to receive the constant electrical signal A0, a collector of the fifth triode Q5 connected to the constant voltage source VCC, and an emitter of the triode Q5 grounded, wherein a bias resistor R12 is connected between the base of the fifth triode Q5 and the ground. The base of the sixth triode Q6 is connected to the collector of the fifth triode Q5, a collector of the sixth triode Q6 electrically connected to the dimming module

629, and an emitter of the sixth triode Q6 electrically connected to the sensor module 42.

When the constant electrical signal A0 is the first signal A01, the fifth triode Q5 is conducted to cause that the base of the sixth transistor Q6 is at the low level and the sixth triode Q6 is also conducted, so that both the sensor module 42 and the dimming module 629 are conducted, and the detection signal b22 is output to the dimming module 629 through the sixth triode Q6, wherein the dimming module 629 outputs the drive regulation signal b32 of the first state b32-1, so that both the LED drive power supply 32 and the LED light bead 52 are controlled by the sensor module 42.

When the constant electrical signal A0 is the second signal A02, the fifth triode Q5 is turned off to cause that the base of the sixth transistor Q6 is to at the high level and the sixth triode Q6 is also turned off, so that both the sensor module 42 and the dimming module 629 are not conducted, wherein the dimming module 629 outputs the drive regulation signal b32 of the second state b32-2, so that both the LED drive power supply 32 and the LED light bead 52 are not controlled by the sensor module 42.

The dimming module 629 includes a dimming chip U0 including an input pin 8 and an output pin 7, the input pin 8 connected to the sensor module 42 and configured to receive the detection signal b22 that is sent from the sensor module 42, the output pin 7 configured to output the drive regulation signal b32 corresponding to the first state b32-1 or the second state b32-2 based on whether the input pin 8 receives the detection signal b22, to control the LED drive module 32.

A Fourth Embodiment

Figure 14:
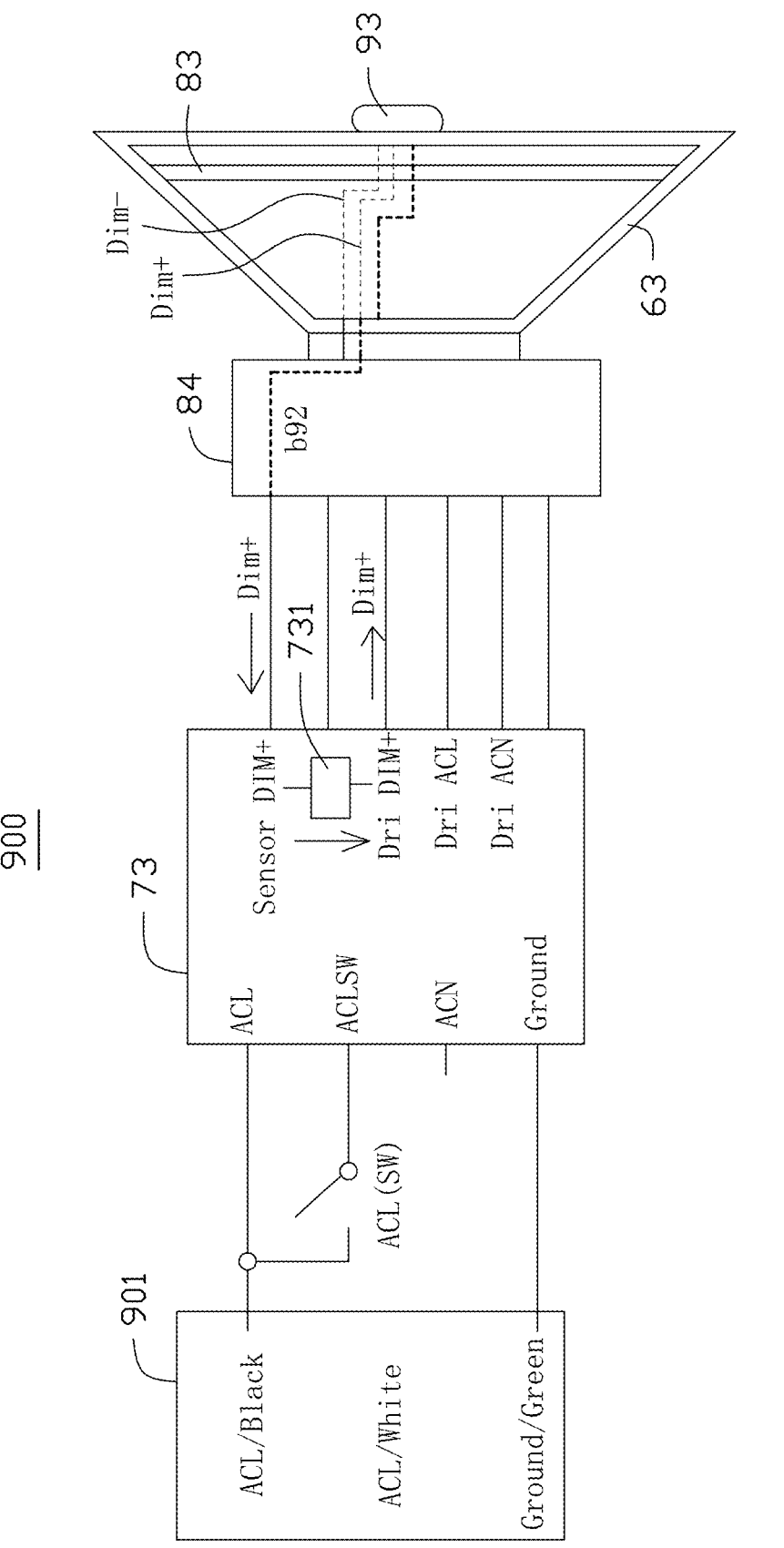
FIG. 14 is a schematic diagram of an LED lamp drive system in accordance with another embodiment of the present disclosure.

Referring to FIG. 14, an LED lamp drive system with an emergency power supply thereof according to another embodiment of the present disclosure is provided. The LED lamp drive system 900 includes: a sensor module 93, an LED module 83, an LED drive power supply 84 and an emergency power supply 73.

The sensor module 93 is configured to obtain a peripheral environmental status of the LED lamp drive system 900 and output a detection signal b92 based on the environmental status, wherein the detection signal b92 is output through a positive output terminal DIM+. The LED drive power supply 84 is installed on an LED lamp 63 to supply power to the sensor module 93 and the LED module 83, for obtaining illumination and sensing detection thereof. The emergency power supply 73 is connected to an electric supply network 901 and configured to obtain electrical energy from the electric supply power network 901 for being charged.

The emergency power supply 73 includes a sensing input terminal Sensor Dim+ and a control output terminal Dri DIM+, wherein the sensing input terminal Sensor Dim+ and the control output terminal Dri DIM+ are electrically connected inside the emergency power supply 73 through a controllable switching element 731, and the control output terminal Dri DIM+ is electrically connected to the LED drive power supply 84. The positive output terminal DIM+ is electrically connected to the sensing input terminal Sensor Dim+.

During in a mains power working mode, the emergency power supply 73 is configured to supply power to both the LED drive power supply 84 and the sensor module 93, and control the controllable switching device 731 to be conducted, so that the detection signal b92 is output to the LED drive power supply 84 through all of the positive output terminal DIM+, the sensing input terminal Sensor Dim+ and the control output terminal Dri DIM+.

During in an emergency working mode, the emergency power supply 73 is configured to disconnect a communication link between the sensing input terminal Sensor Dim+ and the control output terminal Dri DIM+, so that the detection signal b92 is blocked outside of the LED drive power supply 84 to urgently cut off the sensor module 93.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An light emitting diode (LED) lamp drive system with an emergency power supply thereof electrically connected with an electric supply network and configured to obtain electrical energy from the electric supply network, wherein the LED lamp drive system comprises:

an emergency power supply electrically connected to the electric supply network and configured to obtain electrical energy from the electric supply network and then store the electrical energy that is obtained, so as to transmit the stored electrical energy to the outside during in an emergency working mode;

a power switching module electrically connected to both the electric supply network and the emergency power supply, and configured to switch a working mode of the LED lamp drive system according to an input voltage of the electric supply network, wherein the working mode comprises the emergency working mode and a mains power working mode, and the power switching module is configured to output a mode switching signal;

an LED drive power supply electrically connected to both the emergency power supply and the power switching module, and configured to obtain electrical energy from the emergency power supply during in the emergency working mode, or obtain electrical energy from the electric supply network through the emergency power supply during in the mains power working mode;

a sensor module configured to obtain a peripheral environmental status of the LED lamp drive system and output a detection signal based on the environmental status;

an LED light bead electrically connected to the LED drive power supply, wherein the LED light bead is driven by the LED drive power supply to be lit up;

a drive control module electrically connected to all of the power switching module, the sensor module and the LED drive power supply, and configured to obtain the detection signal of the sensor module and output a drive regulation signal to the LED drive power supply according to the detection signal, so that the LED drive power supply drives the LED light bead to light up according to a drive mode corresponding to the detection signal, wherein the drive regulation signal comprises a first state and a second state, and the drive regulation signal in the first state is independent from the detection signal of the sensor module, while the drive regulation signal in the second state corresponds to the detection signal; and wherein the drive control module is controlled by a mode switching signal that is sent from the power switching module, and configured to control the drive regulation signal to be the first state or the second state according to different working modes that are switched by the power switching module; and wherein during in the emergency working mode, the drive control module outputs the drive regulation signal of the first state, so that both the LED drive power supply and the LED light bead are not controlled by the sensor module, and during in the mains power working mode, the drive control module outputs the drive regulation signal of the second state, so that both the LED drive power supply and the LED light bead are controlled by the sensor module.

2. The LED lamp drive system as claimed in claim 1, wherein the emergency power supply comprises:

a charging module electrically connected between the electric supply network and a battery pack unit, wherein during in the mains power working mode, the electric supply network is configured to supplement electrical energy to the battery pack unit through the charging module; and a discharge switch module electrically connected to the battery pack unit, wherein during in the emergency working mode, the discharge switch module is controlled to enable the battery pack unit to supply power to the LED drive power supply for obtaining emergency illumination thereof.

3. The LED lamp drive system as claimed in claim 2, wherein the power switching module comprises:

a first microcontroller configured to detect whether the emergency power supply is in a supplementary power state, form an emergency detection signal, and output a discharge control signal and a relay control signal based on the emergency detection signal;

a first relay comprising two pairs of input terminals that are first input terminals and second input terminals, the first input terminals electrically connected to the electric supply network, and the second input terminals electrically connected to the discharge switch module; and wherein the discharge control signal is configured to control the discharge switch module to work, the relay control signal configured to control the first relay to work, and enable output terminals of the first relay to electrically connect to the first input terminals or the second input terminals; and wherein when the emergency detection signal corresponds to the supplementary power state, the LED lamp is during in the mains power working mode, the discharge control signal is configured to control the discharge switch module to be in a discharge off state, and the relay control signal is configured to control the first input terminals to conduct with the output terminals; and wherein when the emergency detection signal corresponds to a non-supplementary power state, the LED lamp is during in the emergency working mode, and the discharge control signal is configured to control the discharge switch module to be in a discharge working state, and output the electric energy of the battery pack unit, wherein the relay control signal is configured to control the second input terminals to conduct with the output terminals, so that the battery pack unit supplies power to the LED drive power supply through the discharge switch module.

4. The LED lamp drive system as claimed in claim 3, wherein the mode switching signal further comprises a communication control signal transmitted to the drive control module, wherein when the emergency detection signal corresponds to the supplementary power state, the LED lamp is during in the mains power working mode, the communication control signal configured to cause the detection signal to control the drive control module to output the drive regulation signal of the second state to the LED drive power supply, so that the LED drive power supply drives the LED light bead to light up according to the drive mode that corresponds to the detection signal; and wherein when the emergency detection signal corresponds to the non-supplementary power state, the LED lamp is during in the emergency working mode, when the communication control signal is transmitted to the drive control module, the drive control module is configured to forcibly clamp the detection signal, the detection signal is not input to the drive control module, and the drive control module outputs the drive regulation signal of the first state, so that both the LED drive power supply and the LED light bead are not controlled by the sensor module.

5. The LED lamp drive system as claimed in claim 4, wherein the drive control module comprises:

a second microcontroller comprising a first pin, a second pin, and a third pin;

the first microcontroller comprising a fourth pin and a fifth pin; and wherein the first microcontroller and the second microcontroller form a control circuit for controlling whether the communication control signal is connected to the second microcontroller through that a first MOS transistor and a second MOS transistor are connected to each other, and a first triode and a second triode are connected to each other.

6. The LED lamp drive system as claimed in claim 4, wherein the LED drive power supply comprises a Buck-type step-down circuit electrically connected to the LED light bead, and controlled by the drive regulation signal to change a drive voltage of the LED light bead for adjusting an illumination mode of the LED light bead.

7. The LED lamp drive system as claimed in claim 6, wherein the drive voltage is a Pulse Width Modulation (PWM) signal, and the drive regulation signal is configured to adjust at least one of a duty cycle, a frequency, a high level, and a low level of the drive voltage.

8. The LED lamp drive system as claimed in claim 1, wherein when the discharge switch module supplies power to the LED drive power supply, the discharge switch module is configured to invert a direct current (DC) low voltage of the battery pack unit into a DC high voltage and then output the DC high voltage; and wherein the LED drive power supply further comprises an AC-DC conversion module configured to convert an alternating current (AC) voltage that is transmitted from the electric supply network into a DC voltage or a DC current to drive the light LED bead.

9. An light emitting diode (LED) lamp drive system with an emergency power supply thereof electrically connected with an electric supply network and configured to obtain electrical energy from the electric supply network, wherein the LED lamp drive system comprises:

an emergency power supply electrically connected to the electric supply network and configured to obtain electrical energy from the electric supply network and then store the electrical energy that is obtained, so as to transmit the stored electrical energy to the outside during in an emergency working mode;

a power switching module electrically connected to both the electric supply network and the emergency power supply, and configured to switch a working mode of the LED lamp drive system according to an input voltage of the electric supply network, wherein the working mode comprises the emergency working mode and a mains power working mode;

an LED drive power supply electrically connected to both the emergency power supply and the power switching module, and configured to obtain electrical energy from the emergency power supply during in the emergency working mode, or obtain electrical energy from the electric supply network through the emergency power supply during in the mains power working mode;

a sensor module configured to obtain a peripheral environmental status of the LED lamp drive system and output a detection signal based on the environmental status;

an LED light bead electrically connected to the LED drive power supply, wherein the LED light bead is driven by the LED drive power supply to be lit up;

a drive control module electrically connected to input terminals of the LED drive power supply, the sensor module and the LED drive power supply, and configured to obtain the detection signal of the sensor module and output a drive regulation signal to the LED drive power supply according to the detection signal, so that the LED drive power supply drives the LED light bead to light up according to a drive mode corresponding to the detection signal, wherein the drive regulation signal comprises a first state and a second state, and the drive regulation signal in the first state is independent from the detection signal of the sensor module, while the drive regulation signal in the second state corresponds to the detection signal; and wherein the drive control module is controlled by an input voltage of the LED drive power supply, corresponding to different working modes according to different input voltages, and controls the drive regulation signal to be the first state or the second state; and wherein during in the emergency working mode, the drive control module outputs the drive regulation signal of the first state, so that both the LED drive power supply and the LED light bead are not controlled by the sensor module, and during in the mains power working mode, the drive control module outputs the drive regulation signal of the second state, so that both the LED drive power supply and the LED light bead are controlled by the sensor module; and wherein the input voltage comprises an alternating current (AC) voltage from the electric supply network or a direct current (DC) voltage from the emergency power supply, wherein when the input voltage is the DC voltage, the drive control module isolates the detection signal and outputs the drive regulation signal of the first state that is unrelated to the detection signal, and when the input voltage is the AC voltage, the drive control module receives the detection signal of the sensor module to output the drive regulation signal of the second state that corresponds to the detection signal.

10. The LED lamp drive system as claimed in claim 9, wherein the sensor module comprises a pair of input terminals and a pair of output terminals, and the drive control module comprises:

an input detection module configured to detect an input voltage of input terminals of the LED drive power supply to determine whether the input voltage is the DC voltage or the AC voltage, and output a high level or a low level;

a detection processing module configured to process the high level or the low level that is output from the input detection module to obtain impedance matching, backend isolation and anti-interference thereof;

an amplification module configured to amplify the high level or the low level that is output from the detection processing module;

a second relay configured to receive the high level or the low level that is sent from the amplification module, and perform an on operation or an off operation according to the high level or the low level, the input terminals electrically connected to the second relay, and the sensor module configured to turn on or turn off the pair of input terminals according to a control of the second relay;

a dimming module electrically connected to each of the pair of output terminals, the second relay and the LED drive power supply; and wherein when the pair of input terminals are turned on under the control of the second relay, the LED lamp drive system is during in the mains power working mode, and the sensor module outputs the detection signal to the dimming module, and when the pair of input terminals are disconnected under the control of the second relay, the LED lamp drive system is during in the emergency working mode, and the sensor module stops outputting the detection signal to the dimming module; and wherein the dimming module (650) outputs the drive regulation signal of the first state or the second state to the LED drive power supply based on whether the detection signal is input; and wherein when the detection signal stops inputting to the dimming module, the dimming module outputs the drive regulation signal of the first state to the LED drive power supply; otherwise, the dimming module outputs the drive regulation signal of the second state to the LED driving power supply.

11. The LED lamp drive system as claimed in claim 10, wherein the detection processing module comprises:

a coupling module configured to receive the high level or the low level of the input detection module and output a control signal after performing the impedance matching and the backend isolation thereof; and a voltage comparison following module configured to receive the control signal and perform anti-interference processing on the control signal and then output the control signal that has been performed anti-interference processing.

12. The LED lamp drive system as claimed in claim 11, wherein the input detection module is connected to a RC circuit of the input terminals of the LED drive power supply, the RC circuit configured to isolate a DC signal and conduct an AC signal, detect an output as the high level when the input terminals of the LED drive power supply is the AC voltage, and detect the output as the low level when the input terminals of the LED drive power supply is the DC voltage.

13. The LED lamp drive system as claimed in claim 11, wherein the coupling module is an optical coupling element configured to flip the input high level to the low level, flip the input low level to the high level, and then output to the voltage comparison following module.

14. The LED lamp drive system as claimed in claim 13, wherein the voltage comparison following module is an operational amplifier that forms an in-phase operational amplification circuit;

an output terminal of the operational amplifier connected to the amplification module, wherein the amplification module comprises:

a third triode, a base of the third triode connected to the output terminal of the operational amplifier, a collector of the third triode connected to a constant voltage source, an emitter of the third triode grounded and connected to a negative phase input terminal of the operational amplifier;

a fourth triode, a base of the fourth triode electrically connected to the collector of the third triode, a collector of the fourth triode electrically connected to the constant voltage source, and an emitter of the fourth triode grounded; and wherein the collector of the fourth triode is an amplifying output terminal connected to the second relay to control the second relay to be turned on and turned off.

15. The LED lamp drive system as claimed in claim 14, wherein the LED drive power supply comprises a Buck-type step-down circuit electrically connected to the LED light bead, and controlled by the drive regulation signal to change a drive current of the LED light bead for adjusting an illumination mode of the LED light bead.

16. An light emitting diode (LED) lamp drive system with an emergency power supply thereof electrically connected with an electric supply network and configured to obtain electrical energy from the electric supply network, the LED lamp drive system comprising an emergency working mode and a mains power working mode, wherein the LED lamp drive system further comprises:

an emergency power supply electrically connected to the electric supply network and configured to obtain electrical energy from the electric supply network and then store the electrical energy that is obtained, so as to transmit the stored electrical energy to the outside during in the emergency working mode, wherein the emergency power supply is further configured to output a constant electrical signal that comprises a first signal and a second signal different from each other;

a power switching module electrically connected to both the electric supply network and the emergency power supply, and configured to switch a working mode of the LED lamp drive system to be the emergency working mode or the mains power working mode by using the constant electrical signal according to an input voltage of the electric supply network;

an LED drive power supply electrically connected to both the emergency power supply and the power switching module, and configured to obtain electrical energy from the emergency power supply during in the emergency working mode, or obtain electrical energy from the electric supply network during in the mains power working mode;

a sensor module configured to obtain a peripheral environmental status of the LED lamp drive system and output a detection signal based on the environmental status;

an LED light bead electrically connected to the LED drive power supply, wherein the LED light bead is driven by the LED drive power supply to be lit up;

a drive control module electrically connected to all of the emergency power supply, the sensor module and the LED drive power supply, the drive control module configured to supply power to the sensor module and obtain a detection signal of the sensor module, and output a drive regulation signal to the LED drive power supply according to the constant electrical signal and the detection signal, so that the LED drive power supply drives the LED light bead to light up according to a drive mode that corresponds to the constant electrical signal, wherein the drive regulation signal comprises a first state and a second state; and wherein the drive control module is controlled by the constant electrical signal, corresponding to different working modes based on different constant electrical signals, and controls an output of the drive regulation signal; and wherein during in the mains power working mode, the emergency power supply outputs the first signal to the drive control module, the drive control module receives the detection signal from the sensor module and outputs the drive regulation signal of the first state based on the detection signal, so that both the LED drive power supply and the LED light bead are controlled by the sensor module; and wherein during in the emergency working mode, the emergency power supply outputs the second signal, and the drive control module stops receiving the detection signal from the sensor module and outputs the drive regulation signal of the second state, so that both the LED drive power supply and the LED light bead are not controlled by the sensor module.

17. The LED lamp drive system as claimed in claim 16, wherein the drive control module comprises:

a detection processing module configured to detect the constant electrical signal to determine whether the constant electrical signal is in the first signal or the second signal, and to control the detection signal of the sensor module to be input to the drive control module or be stopped inputting to the drive control module;

a dimming module electrically connected to all of the detection processing module, the sensor module and the LED drive power supply, wherein the detection processing module controls the dimming module to receive or stop receiving the detection signal that is sent from the sensor module; and wherein when the detection processing module receives the first signal that is output from the emergency power supply, the detection processing module controls the dimming module to receive the detection signal, and the dimming module is configured to output the drive regulation signal of the first state to the LED drive power supply, so that both the LED drive power supply and the LED light bead are controlled by the sensor module; and wherein when the detection processing module receives the second signal that is output from the emergency power supply, the detection processing module controls the dimming module to stop receiving the detection signal, and the dimming module is configured to output the drive regulation signal of the second state to the LED drive power supply, so that both the LED drive power supply and the LED light bead are not controlled by the sensor module.

18. The LED lamp drive system as claimed in claim 17, wherein the detection processing module comprises:

a fifth triode, a base of the fifth triode configured to receive the constant electrical signal, a collector of the fifth triode connected to a constant voltage source, and an emitter of the triode grounded, wherein a bias resistor is connected between the base of the fifth triode and the ground;

a sixth triode, a base of the sixth triode connected to the collector of the fifth triode, a collector of the sixth triode electrically connected to the dimming module, and an emitter of the sixth triode electrically connected to the sensor module; and wherein when the constant electrical signal is the first signal, the fifth triode is conducted to cause that the sixth triode is also conducted, so that both the sensor module and the dimming module are conducted with each other, and the detection signal is output to the dimming module through the sixth triode, wherein the dimming module outputs the drive regulation signal of the first state, so that both the LED drive power supply and the LED light bead are controlled by the sensor module; and wherein when the constant electrical signal is the second signal, the fifth triode is turned off to cause that the sixth triode is also turned off, so that both the sensor module and the dimming module are not conducted, wherein the dimming module outputs the drive regulation signal of the second state, so that both the LED drive power supply and the LED light bead are not controlled by the sensor module.

19. The LED lamp drive system as claimed in claim 18, wherein the dimming module comprises a dimming chip comprising an input pin and an output pin, the input pin connected to the sensor module and configured to receive the detection signal that is sent from the sensor module, the output pin configured to output the drive regulation signal corresponding to the first state or the second state based on whether the input pin receives the detection signal, to control the LED drive module.

20. The LED lamp drive system as claimed in claim 17, wherein both the first signal and the second signal are level signals with different levels thereof.

21. An light emitting diode (LED) lamp drive system with an emergency power supply thereof comprising:

a sensor module configured to obtain a peripheral environmental status of the LED lamp drive system and output a detection signal based on the environmental status, wherein the detection signal is output through a positive output terminal;

an LED module;

an LED drive power supply installed on an LED lamp to supply power to the sensor module and the LED module, for obtaining illumination and sensing detection thereof;

an emergency power supply connected to an electric supply network and configured to obtain electrical energy from the electric supply power network for being charged, the emergency power supply comprising a sensing input terminal and a control output terminal, wherein the sensing input terminal and the control output terminal are electrically connected inside the emergency power supply through a controllable switching element, and the control output terminal is electrically connected to the LED drive power supply; and wherein the positive output terminal is electrically connected to the sensing input terminal; and wherein during in a mains power working mode, the emergency power supply is configured to supply power to both the LED drive power supply and the sensor module, and control the controllable switching device to be conducted, so that the detection signal is output to the LED drive power supply through all of the positive output terminal, the sensing input terminal and the control output terminal; and wherein during in an emergency working mode, the emergency power supply is configured to disconnect a communication link between the sensing input terminal and the control output terminal, so that the detection signal is blocked the outside of the LED drive power supply to urgently disconnect the sensor module.

\* \* \* \* \*